H. STUKART.
BACKPLATE FOR MEAT SLICING MACHINES.
APPLICATION FILED JULY 17, 1916.
1,243,894. Patented Oct. 23, 1917.
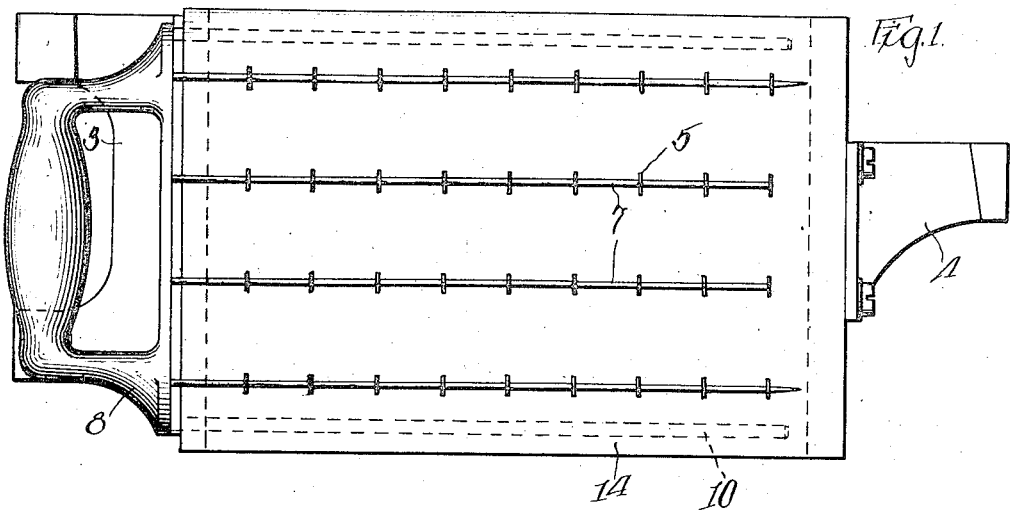
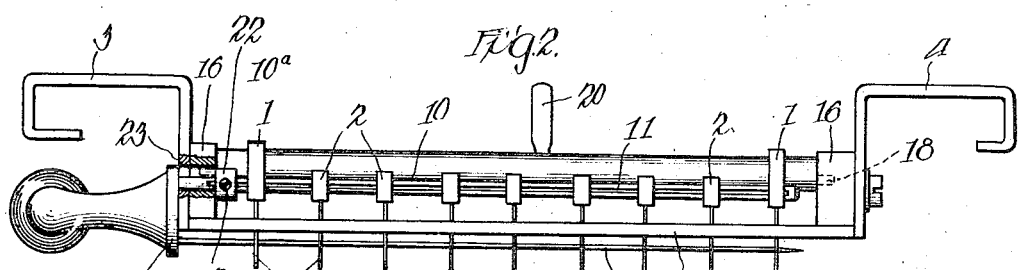
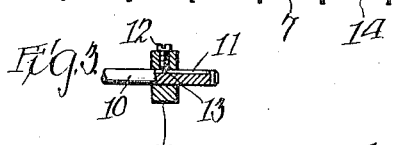
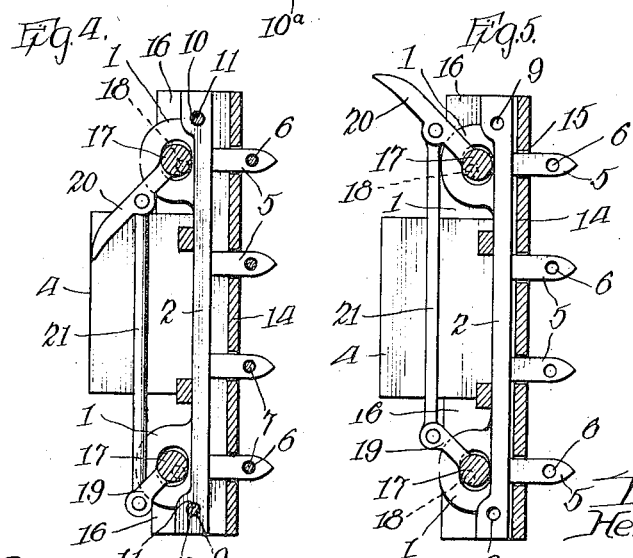
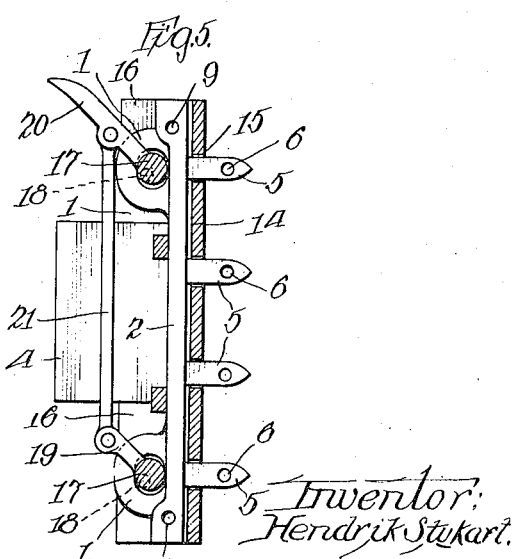
Inventor:
Hendrik Stukart.
By Brown, Nissen & Sprinkle, Attys.
Witness:
Leo J. Dubois

UNITED STATES PATENT OFFICE.

HENDRIK STUKART, OF LAPORTE, INDIANA, ASSIGNOR TO U. S. SLICING MACHINE COMPANY, OF LAPORTE, INDIANA, A CORPORATION OF ILLINOIS.

BACKPLATE FOR MEAT-SLICING MACHINES.

1,243,894.  Specification of Letters Patent.  Patented Oct. 23, 1917.

Application filed July 17, 1916. Serial No. 109,602.

*To all whom it may concern:*

Be it known that I, HENDRIK STUKART, a subject of the Queen of Holland, residing at Laporte, in the county of Laporte and State of Indiana, have invented certain new and useful Improvements in Backplates for Meat-Slicing Machines, of which the following is a specification.

This invention relates to a device for holding a piece of meat for slicing on the meat table of a meat-slicing machine, and is commonly known in the art as a back plate. The principal object of the invention is to provide new and improved means for securing and holding a piece of meat to be sliced. The invention consists in the features of novelty in the construction, combination and arrangement of the several parts.

In the accompanying drawings—

Figure 1 is an elevation of the front of a back plate constructed in accordance with the principles of the invention; Fig. 2 is a top elevation; Fig. 3 is a detail of the slidable pin holder; Fig. 4 is a sectional view showing the back plate in the meat-locking position; and, Fig. 5 is a sectional view showing the back plate in a different position with the meat-holding pins withdrawn.

In a meat-holding back plate it is desirable not only that the meat be firmly held while the slicing operation is taking place, but also that the meat may be easily attached and removed from the back plate. In the present invention it is necessary only to press the meat firmly against the tines so they will enter the meat, and then to insert a plurality of pins in a transverse direction through the meat and through the perforations in the tines provided for that purpose.

This back plate comprises a frame which is made up of end pieces 1, and a plurality of transverse bars 2. Attached to one end of the back plate is a double-ended bracket 3, and attached to the other end is a single-ended bracket 4, for holding the back plate on the meat-slicing machine.

Extending from the bars 2 are a plurality of tines 5 arranged in rows in at least one direction, and each preferably being flat in shape and pointed at the extremity, as clearly shown in Figs. 4 and 5. Near the extremity, or at some distance from the bars 2 to which they are attached, these tines are each provided with a perforation 6, and in each row of tines the perforations are alined so that a thin bar or pin 7 may be inserted through the perforations of each row from one side of the back plate. These pins 7 are pointed, and are preferably less in diameter than the diameter of the perforations 6, so that they will easily enter and pass through the perforations in each row. Each of the pins 7 is attached at one end to a handled holder 8, which is positioned at one side of the frame. At the top and bottom of the frame pieces and bars 1 and 2 are registering openings 9, through which bars 10 are slidable. These bars are attached to the holder 8, and serve as a guide for the holder and for the pins 7, so that they may be inserted through the perforations of the tines 5 by the sliding movement of the holder. In order to limit the outward movement of the holder, one or both of the bars 10 are provided with a longitudinal groove 11, which terminates a short distance from the outer end of the bars, as clearly shown in Fig. 3, and adjacent the end piece 1, at one end of the frame, is a collar $10^a$, in which is a set screw 12 with a point 13 which engages in the groove 11, and prevents the removal of the holder under ordinary operation.

Interposed between the outer side of the cross-bars 2 and the pins 7, is a plate 14, which has perforations 15, through which the tines 5 extend, thereby allowing the plate to be moved with respect to the frame and the tines. For moving the frame with respect to the plate, end pieces 16 are secured to the rear side of the plate, and cam bars 17 extend through the perforations of the end pieces 1, and are eccentrically mounted in the end pieces 16 by means of pivots 18. Extending from one of the bars 17 is an arm 19, and extending from the other is a lever 20, connected to the arm by a link 21, so that the bars may be rotated in unison. The rotation of the bars causes the relative movement of the plate and frame inwardly and outwardly on the tines 5.

The brackets 3 and 4 are preferably attached to the end pieces 16, and since the bars 10 extend through one of the end pieces and through the bracket 3, it is obvious that the end piece 16 and this bracket must be provided with slots 22 and 23 respectively to permit the relative oscillation of the frame and the holder 8 attached thereto with respect to the plate 14 and its end piece 16.

In operation, the meat is pressed on the tines when the plate is in the position shown by Fig. 5, with the pins 7 withdrawn to one side of the plate. After the tines have been pressed into the meat so that the perforations 6 are entirely covered by the meat, the pins 7 are inserted through the perforations 6 and through the meat between the tines, so that the meat is securely engaged and interlocked by the pins and tines. The plate 14 is then pressed outwardly, as shown in Fig. 4, which binds the meat against the pins 7 and holds the entire piece of meat firmly against the back plate. To remove the meat, or the last piece thereof at any time, the operation just described is reversed; that is, the plate 14 is slightly or wholly withdrawn, whereupon the pins 7 may be drawn outwardly and the meat lifted from the points of the tines which do not hold the meat firmly when the pins 7 are withdrawn. With this construction it is obvious that the meat may be easily attached and removed, and is firmly held when attached, by the back plate as described.

I claim:—

1. In a device of the class described, a plurality of alined sharpened members having perforations adjacent the points, and a pin of sufficient length to be inserted through the perforations of a row of sharpened members.

2. In a meat-holding device, a row of pointed members having perforations adjacent the points, and a pin insertible through the rows of perforations.

3. In a meat-holding device, the combination of a plurality of rows of pointed members having perforations adjacent the points, a plurality of pins insertible through the perforations of said members, and a common operating member to which the pins are attached for operating them simultaneously.

4. In a meat-holding device, a plurality of perforated members which will stick into the meat, pins insertible through the perforations, and means for binding the meat against the pins.

5. In a meat-holding device, a plurality of rows of perforated members which are inserted into the meat to be held, pins corresponding in number to the rows of members insertible through the perforations and through the meat between the said members, and means for pressing the meat against the pins after they are inserted through the perforated members.

6. In a meat-holding device, the combination with a plurality of pointed members insertible into the meat and having perforations adjacent the outer ends, a plurality of pins insertible through the perforations of said members, and a common handled member to which all of the pins are attached.

7. In a meat-holding device, a plurality of tines each having a perforation adjacent the end, a plurality of pins each insertible through the perforations in a row of tines, a member to which the pins are attached, and means for guiding the movement of said member.

8. In a meat-holding device, a frame, a plurality of tines projecting from the frame and having perforations therein, a plurality of pins each adapted to be inserted through the perforations in a row of tines, a member to which the pins are attached, and means in connection with the frame for guiding the said member and the pins.

9. In a meat-holding device, a frame, a plurality of tines projecting from the frame and having perforations therein, a plurality of pins each adapted to be inserted through the perforations in a row of tines, a member to which the pins are attached, and means in connection with the frame for guiding the member and preventing its accidental removal from the frame.

10. In a meat-holding device, the combination with a frame, of a plurality of perforated tines projecting therefrom, a plurality of members each insertible through a row of tines, a member to which the pins are attached at one end, and means for guiding the member with respect to the frame, said means comprising bars slidable in the frame.

11. In a meat-holding device, a frame, a plurality of tines projecting from the frame and insertible into the meat, means slidable in said frame at right angles to the tines, and pins carried by said means insertible through that portion of the meat adjacent the frame which is engaged by the said tines.

12. In a meat-holding device, a frame, a plurality of tines projecting from the frame and insertible into the meat, a plurality of pins, and means guided by the frame into which one end of each of the pins is inserted for moving the pins into the meat transversely of the tines.

13. In a meat-holding device, a frame, a plurality of tines projecting from the frame and insertible into the meat, a plurality of pins, means guided by the frame into which one end of each of the pins is inserted for moving the pins into the meat transversely of the tines, and means in connection with the frame for pressing the meat outwardly against the pins.

14. In a meat-holding device, a frame, a plurality of perforated tines extending from the frame, a peforated plate through which the tines extend, pins insertible through the perforations of the tines on the outer side of the plate, a member to which one end of each of the pins is secured having a slidable mounting in the frame back of the plate, and means to move the plate with respect to the frame.

15. In a meat-holding device, the combination with a plurality of flattened pointed tines each having a perforation adjacent the point, the tines being insertible into the meat to be held so that the perforations are covered, and means insertible through the perforations of the tines to hold the meat in place.

16. In a meat-holding device, the combination with a frame, of pointed members projecting therefrom, a plurality of pins, a holder slidable in the frame to which one end of each of the pins is secured, said holder comprising a bar with a longitudinal slot terminating at a distance from one end, and an adjustable member in connection with the frame projecting into the slot for preventing the removal of the bar and the holder with respect to the frame.

17. In a meat-holding device, a frame and a face plate parallel thereto, a plurality of pins, and a holder for one end of said pins slidable in the frame parallel to said plate, the said pins being spaced at a distance in front of the plate.

18. In a meat-holding device, a frame, a holder slidable parallel to the face of the frame, a plurality of pins each mounted at one end in the holder and slidable with it, and a movable plate interposed between the frame and the said pins.

19. In a meat-holding device, the combination with a frame, a holder slidable in the frame, a plurality of pins carried by the holder and slidable transversely of the frame, and releasable means for normally preventing the withdrawal of the holder from the frame.

20. In a meat-holding device, the combination with a frame comprising a pair of end pieces, a plurality of transverse bars, flat perforated tines projecting from the bars, a plurality of pins insertible from one side through the perforations in rows of tines, a member slidable through said bars of the frame in which the pins are each mounted at one end, a plate having perforations through which the tines extend, and means comprising a pair of connected eccentric bars mounted in the end pieces of the frame for moving the plate inwardly and outwardly with respect to the frame between the bases of the tines and the perforations thereof.

21. A holder for material to be sliced comprising a frame, elongated tines mounted to slide relative to said frame so as to impale material to be sliced, and means carried by said frame for engaging said tines to brace said tines against lateral bending.

22. A holder for material to be sliced comprising a frame, a member mounted to slide on said frame and having elongated tines secured thereto, and means for supporting said tines against lateral bending at points removed from said member.

23. A holder for material to be sliced comprising a frame, a device slidably mounted on said frame, elongated tines secured to said device and arranged to move longitudinally in a direction parallel with said frame when said device is slid thereon, and means connected with said frame for engaging said tines at points removed from their points of connection with said sliding device for holding said tines against bending.

24. A holder for material to be sliced comprising an upright frame, a supplementary frame slidably mounted on said upright frame, elongated tines carried by said supplementary frame, means for guiding said supplementary frame on said upright frame to cause said tines to move longitudinally in the direction of the plane of said upright frame, and means connected with said upright frame having recesses therein for receiving the ends of said tines when said tines are moved by said supplementary frame.

In testimony whereof I have signed my name to this specification, on this 13th day of July A. D. 1916.

HENDRIK STUKART.